United States Patent [19]

Basile et al.

[11] 4,374,118

[45] Feb. 15, 1983

[54] PROCESS FOR STABILIZING FERROMAGNETIC CHROMIUM DIOXIDE

[75] Inventors: Giampiero Basile, Alessandria; Giancarlo Boero, Asti; Emiliano M. Ceresa, Vigliano Biellese; Franco Montino, Casale Monferrato, all of Italy

[73] Assignee: Montedison S.p.A., Milan, Italy

[21] Appl. No.: 318,413

[22] Filed: Nov. 5, 1981

Related U.S. Application Data

[63] Continuation-in-part of Ser. No. 206,190, Nov. 12, 1980, abandoned.

[30] Foreign Application Priority Data

Nov. 16, 1979 [IT] Italy ................................ 27333A/79

[51] Int. Cl.$^3$ ............................................ C01G 37/027
[52] U.S. Cl. ................................. 423/607; 252/62.51
[58] Field of Search ....................... 423/607; 252/62.51

[56] References Cited

U.S. PATENT DOCUMENTS

3,512,930  5/1970  Bottjer et al. ................ 252/62.51 X
3,529,930  9/1970  Bottjer et al. ................ 252/62.51 X
4,126,714  11/1978  Haines ........................... 252/62.51 X

FOREIGN PATENT DOCUMENTS

50-47899  4/1975  Japan ................................. 423/607

Primary Examiner—Jack Cooper
Attorney, Agent, or Firm—Stevens, Davis, Miller & Mosher

[57] ABSTRACT

This invention relates to a process for stabilizing ferromagnetic chromium dioxide in respect of water and oxidizable organic compounds which it may contact in magnetic tapes. The process is applicable to a starting $CrO_2$ having good magnetic properties, i.e. a coercive force not lower than about 400 Oersted, a maximum magnetic induction $B_m$ not lower than about 2500 gauss, and a magnetic induction $B_r$ not lower than about 1600 gauss. The $CrO_2$ is subjected to a heat treatment at a temperature ranging from 300° to 390° C. in the presence of a gas stream not exerting any oxidizing or reducing action on the compounds of trivalent, tetravalent and hexavalent chromium. Suitable gases are, for example, nitrogen, helium and argon.

5 Claims, No Drawings

PROCESS FOR STABILIZING FERROMAGNETIC CHROMIUM DIOXIDE

This application is a continuation-in-part of copending U.S. application Ser. No. 206,190 filed on Nov. 12, 1980, and now abandoned.

The present invention relates to a process for stabilizing ferromagnetic chromium dioxide.

Chromium dioxide is a material endowed with high magnetic characteristics, which is predominantly used in the field of magnetic recording tapes. It exhibits a certain chemical reactivity with respect to water and certain organic substances, and particularly with respect to those containing easily oxidizable functional groups, such as, for example, hydroxyl or amino groups. Such functional groups are often present in the resins used in the compositions for magnetic tapes. The $CrO_2$ particles incorporated in the tape may oxidize these functional groups simultaneously reducing themselves at least superficially, to chromium compounds having a lower valence, such as CrOOH, which are not ferromagnetic. As a result, the residual magnetization of the magnetic tape may decrease as time goes on.

As a consequence, a tape on which a recording has been carried out may exhibit, after a certain time period, a decrease in output level.

As is known, $CrO_2$ can be stabilized by subjecting the surface of its particles to a reducing treatment by reacting it, for example, with $H_2S$ or alkaline bisulphites. In this way a reduced phase forms on the particle surface, in which the chromium valence is between 3 and 4. However, the presence of such foreign phase causes a lowering of the maximum and residual magnetization of $CrO_2$. Furthermore, such treatment has the drawback of consuming, through the reduction reaction, a considerable amount (up to about 30%) of treated $CrO_2$.

It has been also suggested to stabilize $CrO_2$ by coating its particles with various water-insoluble inert substances, for example with $SiO_2$ or $Al_2O_3$. Often it was not possible to obtain an appreciable stabilizing effect by means of such coatings. In addition, they cause also a decrease of the maximum and residual magnetization of the product. Furthermore, such coatings involve physical modifications of the surface of the $CrO_2$ particles: there is an increase in the specific surface of the magnetic pigment and, consequently, in its binder absorption, which makes it impossible to prepare a magnetic layer of resin and pigment in which the volume concentration of $CrO_2$ may be sufficiently high as to impart to the tape a good storage capacity for the signals.

Furthermore, these two kinds of methods require an accurate preliminary grinding of $CrO_2$ in order to make the stabilizing treatment possible.

It is an object of this invention to provide a process useful for imparting to $CrO_2$ a high chemical stability with respect to water and oxidizable organic substances and as a consequence a high chemical stability in the magnetic tapes in which $CrO_2$ is employed.

Another object is to obtain such result without resorting to a surface chemical reaction with $CrO_2$, thereby avoiding consumption of part of such $CrO_2$ during the stabilizing treatment.

A further object is to stabilize $CrO_2$ without causing a lowering of the maximum and residual magnetization of the product as a consequence of the treatment.

Still another object is to prevent an increase of the specific surface and of the binder absorption of $CrO_2$, and therefore to allow a good volume concentration of $CrO_2$ in the magnetic layer of the tape.

A further object is to provide a stabilizing process which is very easily practiced and capable of obviating an accurate grinding of $CrO_2$ prior to treatment.

A still further object is to provide a stabilized ferromagnetic chromium dioxide having the indicated desirable properties.

These and still further objects are achieved by the process of the present invention, according to which a chromium dioxide having a coercive force equal to or higher than about 400 Oersted, a maximum magnetic induction $B_m$ equal to or higher than about 2500 gauss, and a residual magnetic induction $B_r$ equal to or higher than about 1600 gauss is stabilized according to the following procedure, the process consisting essentially of subjecting $CrO_2$ to a heat treatment at a temperature ranging from 300° to 390° C. in the presence of a flow of a gas not exerting any oxidizing or reducing action on the compounds of trivalent, tetravalent and hexavalent chromium.

In fact it has been found, according to this invention, that starting from a $CrO_2$ having satisfactory magnetic characteristics, it is possible to attain a good stabilization by subjecting the product to a thermal treatment in a narrow temperature range (300°–390° C.) in a gas stream not exerting any oxidizing or reducing activities on the compounds of trivalent, tetravalent and hexavalent chromium. The choice of this gas represents a critical feature of the present invention: should oxygen be used, for example, which, at such temperatures, is capable of oxidizing trivalent chromium compounds, for instance CrOOH, to $CrO_2$, the attainable stabilizing effect would be nil or negligible.

As a gas free from oxidizing and reducing properties it is possible to use nitrogen or a rare or noble gas, for example helium or argon. Nitrogen is preferably used. The gas stream flow rate must be a function of the amount of $CrO_2$ to be treated. It is advisable to use a flow rate ranging from 2.5 to 100 liters/hour/kg of $CrO_2$ measured at room temperature. Higher flow rates may also be used but that would involve a higher cost of operation without any further improvement in the results. If lower flow rates are used, it may happen that a sufficient stabilization is not obtained.

As already explained, another critical feature of this process consists in that the starting $CrO_2$ must possess a certain level of magnetic properties: the coercive force must be equal to or higher than about 400 Oersted, $B_m$ must be equal to or higher than about 2500 gauss, and $B_r$ must be equal to or higher than about 1600 gauss.

These measurements have been carried out in a magnetizing field of 1000 Oersted.

By subjecting products having magnetic properties much below these values to the treatment according to the present invention, only a low or even no stabilizing effect is achieved. This peculiarity does not limit in any way the usefulness of this invention, because products endowed with magnetic properties lower than the above-specified values are of no use.

The process of the invention is applicable to both non-modified chromium dioxide and to chromium dioxide modified with one or more modifying elements such as, for example, Sb, Te, Sb and Fe, Te and Fe.

A non-modified $CrO_2$ exhibiting the degree of magnetic properties as required by the present invention may be prepared, for example, starting from $Cr_2O_5$ according to the process described in U.S. Pat. No. 3,117,093. It may also be prepared starting from $CrO_3$ and from the product prepared by calcination at 600° C. of $Cr(OH)_3$ obtained from $Cr(NO_3)_3.9H_2O$, conforming to the process of U.S. Pat. No. 3,278,263.

A $CrO_2$ modified with Sb (or with Sb and Fe), having the required level of magnetic properties, may be prepared, for example, from $CrO_3$ and $Sb_2O_3$ (and hydrated ferric oxide) in the presence of water according to the process of U.S. Pat. No. 2,923,683. It may also be obtained from $Cr_2(CrO_4)_3.11\ H_2O$ and $Sb_2O_3$ (and hydrated ferric oxide) according to the process of U.S. Pat. No. 3,979,310.

A $CrO_2$ modified with Te (or with Te and Fe) exhibiting the required degree of magnetic properties is obtainable for example, from $Cr_2(CrO_4)_3.11H_2O$ and $H_6TeO_6$ (and $FeSO_4$) according to the process of British Pat. No. 1,524,576.

The same products prepared according to other processes and other products may be used as the starting products of the present invention, provided their magnetic properties are not lower than the values specified above.

The product to be treated needs a rough preliminary grinding, such as to provide a ground product having sizes not exceeding 200 μm. Said grinding can be effected in a dry grinder, for example in a Alpine impact stud mill with counter-rotating stud disks of the Contraplex type.

Successively, one may then proceed to the thermal treatment in a flow of nitrogen or of another suitable gas, at temperatures ranging from 300° to 390° C. At operating temperatures below 300° C., no sufficient stability is achieved. At operating temperatures above 390° C., $CrO_2$ tends to decompose. Preferred operating temperatures range between 340° and 390° C.

The higher the operating temperature, the slower treatment time is.

Generally, the treatment time ranges from 20 minutes to 15 hours. For products having a very high coercive force, i.e. with an $H_c$ of at least 750 Oersted, it is necessary to employ relatively short times for calcination, for example of 20–45 minutes, and relatively high temperatures, for example 370°–390° C.

Calcination can be effected in a static furnace or, preferably, in a rotary furnace.

After calcination, the calcined product can be washed with water. Such washing is carried out in order to remove the hexavalent chromium contained in the starting product as well as any that may have formed during the calcining treatment.

For starting products containing no more than 1000–2000 ppm of Cr(VI), calculated as $CrO_3$, such washing is not essential: products having good stability characteristics may be obtained without washing; however, the corresponding washed products prove to be somewhat more stable. Prior to washing, it is advisable to carry out a wet grinding, for example in a sand mill, till reaching a granulometry of the order of 10μ or less. In this case washing proves highly effective and the washed and dried product has a content of residual Cr(VI) of only 100–300 ppm.

Drying of the washed product is carried out at temperatures which are low enough to prevent $CrO_2$ from reacting with water. It is suitable to work for example at 60°–70° C., operating under vacuum, for example at 15 mm Hg pressure.

Since wet grinding is more effective than dry grinding, it is preferable to subject the product to wet grinding and to washing.

Otherwise a dry grinding is carried out, for example in an Alpine impact stud mill with counter-rotating stud disks of the Contraplex type, till obtaining, for instance, particles with a granulometry of the order of 100 μm.

The products stabilized according to the present invention exhibit a remarkable stability to water and to oxidizable organic substances, and therefore prove to be highly stable in the magnetic tapes.

The stability of said products was evaluated on a tape, under particularly severe conditions, according to a method known per se, which consists in exposing a magnetic tape made with $CrO_2$ for a few days in a warm chamber at a high relative humidity, and in measuring the worsening of the residual magnetic induction caused by such exposure. Such worsening is substantially proportional to the decomposition of $CrO_2$.

The main advantages of the present invention, besides the high stability of the product, are in brief the following:

no decrease in the $B_m$ and $B_r$ of the product is caused by the treatment;
  it is not necessary to effect a surface chemical reaction with $CrO_2$, thus avoiding consumption of a portion of the $CrO_2$;
  no increase in the specific surface and in the binder absorption of $CrO_2$ is caused, thereby allowing a good volume concentration of $CrO_2$ in the magnetic layer;
  there is no need to carry out an accurate grinding of $CrO_2$ prior to the treatment; and
  the process of the present invention does not require any $CrO_2$-washing before the treatment, while a washing is necessary when one wishes to coat the $CrO_2$ with a water-insoluble inert substance.

The following examples are given still better to illustrate the inventive idea of the present invention.

EXAMPLE 1

The starting $CrO_2$ contained 900 ppm of Te and 1750 ppm of Fe. It was prepared starting from $Cr_2(CrO_4)_3.11H_2O$, $H_6TeO_6$, and $FeSO_4$ according to Example 12 of British Pat. No. 1,524,578 except as regards the amounts of modifiers and the hydration degree of chromium chromate.

The product exhibited the following magnetic properties: $H_c=600$ Oersted, $B_m=2870$ gauss, $B_r=1780$ gauss.

These properties were measured by means of a hysteresigraph Ferrograph Förster 1003, operating in a magnetizing field of 1000 Oersted.

The accuracy in the $H_c$ measurement was ±10 Oersted. In the measurement of $B_m$ and $B_r$ the accuracy was ±100 gauss.

$CrO_2$ was ground in an Alpine impact stud mill, Contraplex type, to a granulometry of about 100 μm. 100 g of the ground $CrO_2$ were introduced into a quartz 1000 cc bottle, which was made to rotate at about 30 rpm inside a furnace at a temperature of 340°±10° C.

Through a small glass tube having a diameter of 2 mm and penetrating into the bottle, a nitrogen flow of 10 l/h measured at room temperature, was made to pass over the $CrO_2$. Calcining was conducted during 10 hours.

At the conclusion of calcination the bottle was allowed to cool outside the furnace for about 30 minutes, whereupon the cold $CrO_2$ was taken out and dispersed in a beaker in sufficient deionized water to obtain a slurry at 170 g/l of $CrO_2$. The slurry was kept under stirring for 60 minutes by a blade stirrer, rotating at 150 rpm, whereupon the $CrO_2$ was filtered on a Büchner funnel and washed with 10 portions of 500 cc of deionized water each.

The cake thus obtained was dried in an oven under a vacuum of about 10 mm of Hg, at 60° C., for 42 hours. The product was then ground in an agate mortar till obtaining agglomerates having sizes below 100μ.

The magnetic properties of the resulting powder were determined by means of the apparatus described hereinbefore, using the same magnetizing field.

The following results were obtained:

$H_c$=585 oersted, $B_m$=2880 gauss, $B_r$=1760 gauss.

To determine the stability of the product, a film was prepared as follows:

5 g of stabilized chromium dioxide was added with 15 g of a composition for paints based on $CrO_2$ consisting of:

| | |
|---|---|
| polymeric compound (saturated polyurethane and vinyl acetate/vinyl chloride copolymer) | 18% by weight |
| methylethylketone | 40% by weight |
| tetrahydrofuran | 20% by weight |
| dimethylacetamide | 20% by weight |
| anionic surfactant | 2% by weight |

After addition of 15 g of tetrahydrofuran, the whole was introduced into a 100-ml glass container along with 45 g of glass balls having a 5-mm diameter.

The container was placed in a Red Devil vibrating disperser, where it was subjected to an intense stirring or agitation for 1 hour.

Successively a further 10 g of the aforesaid composition and 5 g of tetrahydrofuran were added and the whole was stirred or agitated for a further 5 minutes.

The resulting homogeneous paint was spread on a flexible support consisting of a plasticized paperboard imparting with the film spreader a thickness of 8 mils (203μ). The spread film was allowed to dry for 24 hours, whereupon the $B_r$ was determined by means of the usual apparatus employing the same magnetizing field.

The paperboard-supported film was then exposed for 4 days at 65° C. in a chamber having a relative humidity of 50%. The $B_r$ was measured again and the percentage decrease of such value due to said exposure was calculated. The $B_r$ loss was equal to 5.3%.

With identical film prepared according to the same modalities starting from 5 g of the same not stabilized $CrO_2$ simultaneously subjected to the same accelerated stability test, the resulting $B_r$ was equal to 19.4%.

The stabilized commercial product "$CrO_2S4$" produced by E. I. Du Pont de Nemours (that tape producers consider as having good stability) was subjected, according to the same procedures, and contemporaneously, to the same accelerated stability test. The resulting $B_r$ loss was 11%.

EXAMPLES 2-4

Starting from different types of chromium dioxide, the stabilization of same was obtained by following the same procedures of Example 1.

In test 2, the starting material was non-modified $CrO_2$ prepared from $CrO_3$ and from the product obtained by calcination at 600° C. of $Cr(OH)_3$ obtained from $Cr(NO_3)_3.OH_2O$, according to the procedures of Example 16 of U.S. Pat. No. 3,278,263.

The resulting product exhibited the following magnetic characteristics:

$H_c$=495 Oersted, $B_m$=2870 gauss, $B_r$=1790 gauss.

Test 3 was started from $CrO_2$ modified with 0.55% by weight of Sb obtained from $Cr_2(CrO_4)_3.11H_2O$ and $Sb_2O_3$, according to Example 4 of U.S. Pat. No. 3,979,310, except that it was started from $Cr_2(CrO_4)_3.11H_2O$ instead of from $Cr_2(CrO_4)_3.10H_2O$.

The resulting product had the following magnetic characteristics:

$H_c$=495 Oersted, $B_m$=2840 gauss, $B_r$=1710 gauss.

Test 4 was started from $CrO_2$ modified with 0.17% by weight of Sb, obtained from $CrO_3$ and $Sb_2O_3$ in the presence of water, following Example 7 of U.S. Pat. No. 2,923,683.

The resulting product exhibited the following magnetic characteristics:

$H_c$=390 Oersted, $B_m$=2850 gauss, $B_r$=1750 gauss.

The magnetic properties of the calcined products are indicated in Table 1 below.

The stability test of Example 1 was carried out for each of the products both on the product not subjected to the stabilizing treatment and on the stabilized product.

The results of the stability tests expressed as percentage of $B_r$ loss ($\Delta B_r\%$) are recorded in Table 1.

TABLE 1

| | | Magnetic properties of calcined product | | | $B_r$ loss after stability test: $\Delta B_r \%$ | |
|---|---|---|---|---|---|---|
| Test No. | Composition of the starting product | $H_c$ in Oersted | $B_m$ in gauss | $B_r$ in gauss | stabilized product | non-stabilized product |
| 2 | non-modified $CrO_2$ | 500 | 2,940 | 1,800 | 9.3 | 19.1 |
| 3 | $CrO_2$ - 0.55% Sb | 475 | 2,910 | 1,730 | 8.3 | 18.1 |
| 4 | $CrO_2$ - 0.17% Sb | 400 | 2,810 | 1,725 | 8.6 | 18.3 |

EXAMPLES 5-7

Here the same $CrO_2$ as in Example 1 was employed and the procedures were as in Example 1, except for the following:

(a) grinding prior to calcination was carried out in a more or less accurate manner. More particularly, in test 5 grinding was continued till obtaining a granulometry of about 1 mm. In test 6 grinding was continued up to about 100μ. In test 7 grinding was continued.

(b) washing after calcination was not carried out. The results obtained are recorded in Table 2 below. From an examination of these results it appears that an accurate grinding of the product to be treated is not necessary to ensure good stability.

TABLE 2

| | | Magnetic properties of the calcined product | | | $\Delta B_r \%$ | |
|---|---|---|---|---|---|---|
| Test No. | Product granulometry before calcination | $H_c$ in Oersted | $B_m$ in gauss | $B_r$ in gauss | stabilized product | non-stabilized product |
| 5 | 1 mm | 610 | 2750 | 1700 | 7.2 | 19.4 |
| 6 | 100μ | 610 | 2960 | 1880 | 6.7 | 19.4 |

TABLE 2-continued

| Test No. | Product granulometry before calcination | Magnetic properties of the calcined product | | | ΔB$_r$ % | |
|---|---|---|---|---|---|---|
| | | H$_c$ in Oersted | B$_m$ in gauss | B$_r$ in gauss | stabilized product | non-stabilized product |
| 7 | 10μ | 590 | 2800 | 1740 | 8.6 | 19.4 |

EXAMPLE 8

Here the same $CrO_2$ as in Example 1 was employed and also the same procedures as in Example 1, except for the following:
(a) the $CrO_2$ was calcined at 370°±10° C.,
(b) The calcination time was 2 hours,
(c) no washing after calcination was effected.

The magnetic properties of the calcined product were as follows:

$H_c$=600 Oersted, $B_m$=2850 gauss, $B_r$=1780 gauss.

After the stability test, the $B_r$ loss was 7.4% as against 19.4% for the non-stabilized product simultaneously subjected to the same test.

EXAMPLE 9

This example serves to prove that the use of a gas stream without any oxidizing or reducing action on the compounds of trivalent, tetravalent and hexavalent chromium is critical. For this purpose an $O_2$ stream was employed.

The same chromium dioxide as in Example 1 was employed and the same procedures as in Example 1, with the exception that the calcination treatment was conducted in an $O_2$ stream at a flow rate of 10 l/h and lasted 4 hours.

After calcination the product exhibited the following properties:

$H_c$=600 Oersted, $B_m$=3050 gauss, $B_r$=1950 gauss.

After the stability test, the $B_r$ loss was 16.3% as against 18.2% for the starting product contemporaneously subjected to the same test.

EXAMPLE 10

The starting $CrO_2$ here contained 750 ppm of Te and 17,500 ppm of Fe, and was prepared starting from $Cr_2(CrO_4)_3.11H_2O$, $H_6TeO_6$ and $FeSO_4$, according to British Pat. No. 1,524,578.

The product exhibited the following magnetic properties, determined in an induction field of 2000 gauss:

$H_c$=930 Oersted, $B_m$=3760 gauss, $B_r$=2310 gauss.

The procedure was as in Example 1, except for the following:
(a) the $CrO_2$ was calcined at 380°±10° C.,
(b) the calcination time was 45 minutes,
(c) after calcination, and prior to washing, the $CrO_2$ was subjected to grinding in a microball mill for 30 minutes.

The magnetic properties of the calcined product, measured in an induction field of 2000 gauss, were the following:

$H_c$=860 Oersted, $B_m$=3900 gauss, $B_r$=2300 gauss.

The $B_r$ loss was 8.2% as against 19% for the non-stabilized product simultaneously subjected to the same test.

EXAMPLE 11

The starting $CrO_2$ contained 800 ppm of Te and 4000 ppm of Fe and was prepared starting from $Cr_2(CrO_4)_3.11H_2O$, $H_6TeO_6$ and $FeSO_4$, following the procedures of Example 12 of British Pat. No. 1,524,578, except for the quantities of modifying elements and for the degree of hydration of the chromium chromate. The product showed the following magnetic properties:

$H_c$=575 Oersted, $B_m$=2850 gauss, $B_r$=1800 gauss.

The $CrO_2$ was ground in an impact stud mill, Contraplex type, to a particle size of about 200 μm. 30 Kg of the ground $CrO_2$ were then placed into a cylindrical steel container (capacity: about 200 liters), which was caused to revolve horizontally at about 5 rpm inside a heating sleeve heated up to 360° C.±10° C.

A current of nitrogen was caused to flow over the $CrO_2$, through a 1-inch diameter stainless steel pipe penetrating inside the container, at a flow rate of 30 liter/hour per Kg of $CrO_2$ was made to pass for 1 hour through the container in order to remove the air present therein. At the same time the reaction mass reached a temperature of 350° C. Thereupon the flow of nitrogen was reduced to 3 liter/hour/Kg of $CrO_2$ and calcination was carried on for 10 hours at 350° C. On completion of calcination, the container was allowed to cool down for 12 hours protected from atmospheric humidity. The cold $CrO_2$ was then extracted and dispersed in a 0.5 cu.mt vat in sufficient deionized water to make up a slurry containing 100 g/lt of $CrO_2$. This slurry was maintained under stirring for 60 minutes by a blade stirrer revolving at 20 rpm. The $CrO_2$ was then filtered on a filter press and washed with deionized water (5 liter/Kg of $CrO_2$). The resulting cakes were allowed to dry in an oven under a 10 mm Hg vacuum and at a temperature of 60° C., for 72 hours. The resulting product was dispersed again in water in a concentration of 250 g/lt, and ground in a steel ball-mill of the Molteni type, to a particle size below 10 μm. The ground product was again dried under a vacuum of 10 mm Hg, at 60° C., for 72 hours.

The product exhibited the following magnetic properties when tested under conditions identical to those of Example 1.

$H_c$=525 Oersted, $B_m$=2800 gauss, $B_r$=1800 gauss.

Evaluation of the stability of the product was accomplished as in Example 1. The $B_r$ loss was equal to 10%.

With an identical film, prepared according to the same procedures, starting from 5 g of the same not-stabilized $CrO_2$ and subjecting it at the same time to the same accelerated stability test, the loss in $B_r$ amounted to 22%.

EXAMPLES NOS. 12 and 13

Example 11 was repeated twice, bringing the nitrogen flow-rate respectively up to 4 and 5 liter/hour/Kg of $CrO_2$.

A stability test, in both cases revealed a drop in $B_r$ equal to 10%.

What is claimed is:
1. A process for stabilizing ferromagnetic chromium dioxide having before said stabilization:
(a) a coercive force $H_c \geq$ about 400 Oersted;
(b) a maximum magnetic induction $B_m \geq$ about 2500 gauss; and
(c) a residual magnetic induction $B_r \geq$ about 1600 gauss the process comprising subjecting said $CrO_2$ to a heat treatment at a temperature ranging between 300° and 390° C. in the presence of a stream of gas not exerting any oxidizing or reducing action on compounds of trivalent, tetravalent and hexavalent chromium, and selected from the group consisting of nitrogen and noble gases at a flow rate at least equal to 2.5 liters/hour/kg of $CrO_2$ and for a period of time ranging between 20 minutes and 15 hours.

2. The process of claim 1 wherein said flow rate ranges between 2.5 and 100 liters/hr/kg $CrO_2$.

3. The process of claim 1 wherein said gas is nitrogen.

4. The process of claim 1 wherein said temperature ranges between 340° C. and 390° C.

5. The process of any one of claims 1 through 3 wherein the stabilized $CrO_2$ is washed with water after the treatment.

* * * * *